United States Patent
Tanaka et al.

(10) Patent No.: US 6,577,338 B1
(45) Date of Patent: Jun. 10, 2003

(54) DIGITAL COLOR PRINTER DIGITAL CAMERA AND DIGITAL COLOR PRINTER SYSTEM USING THE SAME

(75) Inventors: Chiharu Tanaka, Hachioji (JP); Yukio Nakajima, Fujinomachi (JP)

(73) Assignee: Olympus Optical Co., Ltd., Tokyo (JP)

( * ) Notice: Subject to any disclaimer, the term of this patent is extended or adjusted under 35 U.S.C. 154(b) by 0 days.

(21) Appl. No.: 09/110,903

(22) Filed: Jul. 6, 1998

(30) Foreign Application Priority Data

Jul. 9, 1997 (JP) .............................................. 9-183743

(51) Int. Cl.[7] .............................................. H04N 5/225
(52) U.S. Cl. .................................... 348/207.2; 348/372
(58) Field of Search ................................ 348/207, 222, 348/373–376, 552, 207.99, 207.1, 207.11, 207.2, 372; H04N 5/225

(56) References Cited

U.S. PATENT DOCUMENTS

| | | | | |
|---|---|---|---|---|
| 4,928,137 A | * | 5/1990 | Kinoshita | .................... 348/297 |
| 4,937,676 A | * | 6/1990 | Finelli | ......................... 348/375 |
| 5,696,850 A | * | 12/1997 | Parulski | ...................... 382/261 |
| 5,847,836 A | * | 12/1998 | Suzuki | ........................ 358/296 |
| 5,894,326 A | * | 4/1999 | McIntyre | ............... 348/333.06 |
| 5,966,553 A | * | 10/1999 | Nishitani | ..................... 396/303 |
| 6,000,864 A | * | 12/1999 | Hanada | ........................ 400/62 |
| 6,091,909 A | * | 7/2000 | McIntyre | ..................... 396/278 |
| 6,094,282 A | * | 7/2000 | Hoda | ......................... 358/401 |
| 6,104,886 A | * | 8/2000 | Suzuki | ........................ 396/429 |
| 2001/0013894 A1 | * | 8/2001 | Parulski | ...................... 348/207 |

* cited by examiner

Primary Examiner—Ngoc-Yen Vu
(74) Attorney, Agent, or Firm—Frishauf, Holtz, Goodman & Chick, P.C.

(57) ABSTRACT

The present invention provides a digital camera comprising a CCD, an A/D conversion circuit for converting an image signal into a digital image data to perform a compression processing, a RAM for memorizing this compressed image data, a CPU for selecting a compressed image data associated with an image to be displayed out of the compressed image data which is memorized in the RAM, and an LCD for displaying this selected image data after a predetermined processing by the aforementioned CPU, and a communication driver for outputting the compressed image data which is memorized in the RAM to a digital color printer, and also provides a digital color printer comprising a communication driver for receiving the aforementioned compressed image data, an image memory to memorize the compressed image data received, and a CPU for subjecting this compressed data which is memorized to a predetermined processing to convert the compressed data to a data which can be printed, wherein the aforementioned CPU outputs a control signal for controlling the LCD of the digital camera by the aforementioned communication driver.

4 Claims, 3 Drawing Sheets

DIGITAL COLOR PRINTER DIGITAL CAMERA AND DIGITAL COLOR PRINTER SYSTEM USING THE SAME

BACKGROUND OF THE INVENTION

The present invention relates to a digital camera for picking up an image and converting the image into an electric signal so as to record the image as a digital image data, a digital color printer for printing the image on the basis of the digital image data, and a digital color printer system for actualizing an optimal printing of the digital image data in the case where the digital image data is output directly from the aforementioned digital camera to the digital printer to carry out printing is most suitable.

In recent years, there are proposed various techniques which are associated with the digital camera for electronically recording a static image by using a solid picking up element in place of a silver salt camera for recording the static image as a chemical change on a film.

In this digital camera, the image which is picked up by users is converted into an electric signal, followed by being recorded as an image file associated with a digital data on an incorporated memory comprising a flash memory or the like, a hard disc, a memory card or the like. Consequently, there is an advantage in that a development process as seen in the conventional silver salt film is not required, and at the same time, immediately after the aforementioned image file is picked up, the image file is read on an attached liquid crystal display part to confirm the image on the spot.

Since the image which is picked up by the aforementioned digital camera is recorded as a digital data on the memory card, the hard disc and the incorporated memory, the image is confirmed, for example, on a monitor screen or the like of a personal computer (hereinafter referred to as PC) or the like followed by being printed by the digital color printer in the case where users actually print a desired image.

When the image is printed by the digital color printer in this manner, there are provided the following advantages; a dark room work of the conventional silver salt picking up is not required as described above. Furthermore, the print can be obtained in a shorter time. In addition, since the aforementioned picked up image is directly produced as an image file, the edition of the image by means of image processing including expansion and shrinkage can be made possible when the aforementioned digital data is input to an information device such as the PC or the like with the result that a print which more agrees with the need of users can be obtained.

A system by means of a combination of the aforementioned digital camera, and a digital color printer is more and more highly estimated because the image picked up by the digital camera can be instantly confirmed, and the image can be realized at a cheap cost relatively.

In addition, in recent years, there is realized a system which is capable of sending an image data directly from the aforementioned digital camera to the digital color printer without intervening the PC and printing the image data with the result that more instant printing can be made possible at a cheaper cost.

However, when general persons print the image data by the digital color printer on the basis of the digital image data obtained by the aforementioned digital camera, various problems are generated as described as follows so that it is desired that the problems are solved.

In other words, when the digital image data obtained by the aforementioned digital camera is sent to the digital color printer, the image data is temporarily converted into a data which can be printed on the digital camera so that the size of the image data agrees with printing paper, or a process for converting the color of the image data to a predetermined color which can agree with color printing so that a load is large which is incurred on the side of the digital camera. Furthermore, in such a case, there is a problem in that since an image which is compressed and stored on the side of the camera is expanded and the image data is transmitted, a considerable time is taken for communication between the digital camera and the digital color printer.

Since the data for printing is prepared and printed without correcting the image data which is picked up by the digital camera, it happens in some cases that the brightness and the color tone differ because of the flashed state of a stroboscope and the change of a shutter speed, and a difference in color reproduction owing to the method of the picking up element appears in the printed image with the result that a print which is desired by users cannot be obtained.

When the digital camera uses a cell or a battery, it sometimes happens that the power source of the digital camera runs out in the midst of printing process as a result of the consumption of the power source during the printing with the result that the printing becomes useless and the usage convenience becomes worse.

Furthermore, when the digital camera uses a power source such as a cell or a battery, it sometimes happen that the camera may be provided with a function of turning off the power source to suppress the consumption of the battery when the digital camera is not operated for a predetermined time. In such a case, there may be an disadvantage in that the power source of the digital camera is automatically turned off despite the fact that the digital camera is connected to the digital color printer with the result that the image data are not transmitted from the digital camera even when an attempt is made to perform printing in an operation on the side of the digital color printer and the printing cannot be completely carried out as a result.

BRIEF SUMMARY OF THE INVENTION

The present invention has been made in view of the aforementioned problems, and an object of the invention is to provide a digital camera, a digital color printer and a digital color printer system using the same for shortening communication time, improving reproduction, and improving usage convenience in the case of sending an digital image of an image picked up by the digital camera to the digital color printer.

To attain the aforementioned object, according to a first aspect of the invention, there is provided a digital color printer which is capable of receiving a compressed image data from a digital camera which converts the picked up image signal into a digital image data and compresses and memorizes the digital image data, the printer comprising: communication means for receiving the compressed data from the aforementioned digital camera; memory means for memorizing the compressed image data which is received by the aforementioned communication means; conversion means for converting the aforementioned received compressed image data into a predetermined print image size which can be printed after subjecting the data to expansion processing; and printing means for printing the image data which is converted by the aforementioned conversion means.

According to a second aspect of the invention, there is provided a digital camera comprising: picking up conversion means for converting a picking up signal obtained by picking up an image into a digital image data; memory means for memorizing the aforementioned digital image data by subjecting the image data to compression processing; control means for subjecting the compressed image data which is memorized in the aforementioned memory means to a predetermined processing; selection means for selecting the digital data associated with an image to be displayed out of the compressed image data which is memorized in the aforementioned memory means; display means for displaying an image after subjecting the image to the predetermined processing by the aforementioned control means with respect to the image associated with the compressed image data which is selected by the aforementioned selection means; and communication means for outputting the compressed image data which is memorized in the aforementioned memory means to an outside machine; wherein at least one of the state at the time of picking up an image and a characteristic for each of the picking up device is sent along with the aforementioned compressed image data.

According to a third aspect of the invention, there is provided a digital color printer system comprising: a digital camera comprising; picking up conversion means for converting an image signal obtained by picking up an image into a digital image data item and subjecting the digital image data to compression processing, memory means for memorizing the aforementioned compressed image data, first control means for subjecting the compressed image data which is memorized in the aforementioned memory means to a predetermined processing, selection means for selecting a compressed image data which is associated with an image to be displayed out of the compressed image data which is memorized in the aforementioned memory means, display means for subjecting the image associated with the compressed image data selected by the selection means to a predetermined processing followed by displaying the image which is subjected to the processing, and first communication means for outputting the compressed image data memorized in the aforementioned memory means to an outside machine; and a digital printer comprising; second communication means for receiving the compressed image data from the aforementioned digital camera, memory means for memorizing compressed image data received by the second communication means, and second control means for converting the compressed image data memorized in the aforementioned memory means to a data which can be printed by subjecting the compressed image data to a predetermined processing, wherein the aforementioned second control means outputs a control signal for controlling the display means of the aforementioned digital camera to the aforementioned second communication means.

According to a fourth aspect of the invention, there is provided a digital color printer for receiving an image signal which is sent by the digital camera for printing an image thereof; characterized in that a residual amount of battery which is used in the aforementioned digital camera is detected, and communication control for printing is not performed when the residual amount of the battery is not more than the predetermined amount.

According to a fifth aspect of the invention, there is provided a digital color printer which is capable of being freely connected and communicated with a digital camera which automatically saves the consumption of power in the case where at least either of an error in operation for a predetermined period or a communication signal with the color printer is not recognized, characterized in that a predetermined communication command is sent while the connection of the communication with the aforementioned digital camera is detected.

According to a sixth aspect of the invention, there is provided a digital camera which automatically saves the consumption of power in the case where at least either of an error in operation for a predetermined period or communication signal with the color printer is not recognized, characterized in that a predetermined communication command is sent while the connection of the communication with the aforementioned digital camera is detected.

Additional objects and advantages of the invention will be set forth in the description which follows, and in part will be obvious from the description, or may be learned by practice of the invention. The objects and advantages of the invention may be realized and obtained by means of the instrumentalities and combinations particularly pointed out hereinafter.

BRIEF DESCRIPTION OF THE SEVERAL VIEWS OF THE DRAWING

The accompanying drawings, which are incorporated in and constitute a part of the specification, illustrate presently preferred embodiments of the invention, and together with the general description given above and the detailed description of the preferred embodiments given below, serve to explain the principles of the invention.

DETAILED DESCRIPTION OF THE INVENTION

Figure 1:
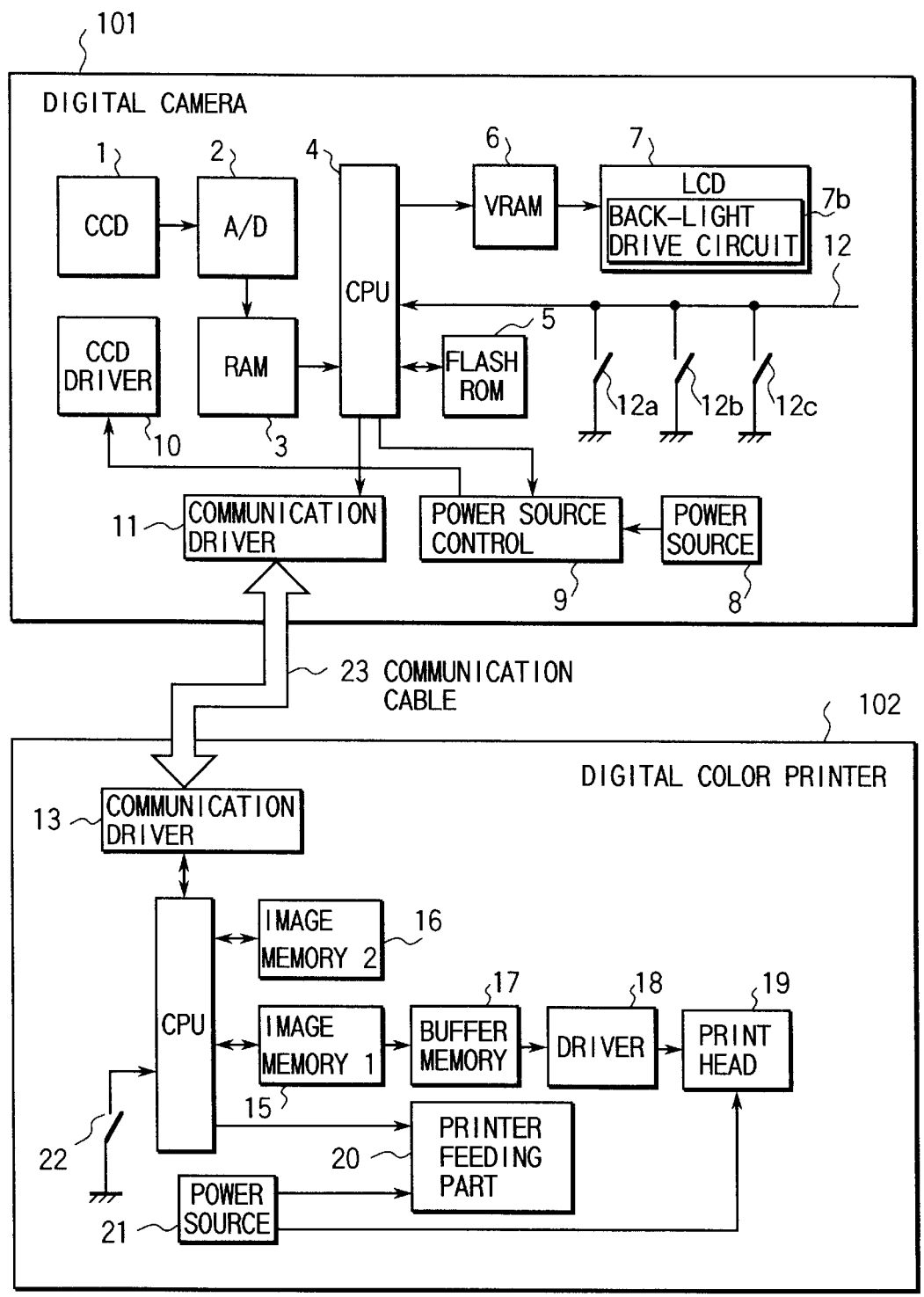
FIG. 1 shows a structure of a digital camera, a digital color printer, and a digital color printer system using the same according to a first embodiment of the invention.

An embodiment of the present invention will be explained by referring to the drawings hereinafter.

FIG. 1 shows a structure of a digital camera, a digital color printer, and a digital color printer system using the same according to one embodiment of the present invention.

As shown in FIG. 1, the digital color printer system comprises a digital camera 101, a digital color printer 102, and a communication cable 203 for connecting the digital camera 101 and the digital color printer 102. A structure of each part will be explained in detail hereinafter.

In the beginning, on the side of the digital camera 101, a CCD 1 is arranged at a predetermined position for receiving light of an object to be picked up which light is incident via a picking up lens not shown to generate an image signal through photo-electric conversion. An output of this CCD 1 is connected to an input of a CPU (Central Processing Unit) 4 via an analog/digital (A/D) conversion circuit 2 at a rear stage and a RAM (Random Access Memory) 3. The aforementioned CCD 1 is driven and controlled with the CCD driver 10 under a command of the CPU 4.

To the input of the aforementioned CPU 4, a flash ROM (Read Only Memory) 5, each kind of operation switch 12, and a power source 8 are further connected respectively. Incidentally, it is assumed with the digital camera 101 according to this embodiment that the flash ROM 5 which serves as a memory medium is incorporated in the camera. However, it goes without saying that a medium which can be detached freely such as, for example, a memory card and a magnetic recording medium can be used.

Furthermore, the aforementioned operation switch 12 comprises a reproduction mode switch 12a for instructing a display of an LCD (liquid crystal display) 7, and switches 12b and 12c for selecting an image frame to be displayed. Furthermore, as explained in detail in FIG. 4, each kind of switches 12a through 12c is arranged in the vicinity of the LCD 7 at a rear surface of a camera 101. However, the present invention is not limited thereto.

Figure 4:
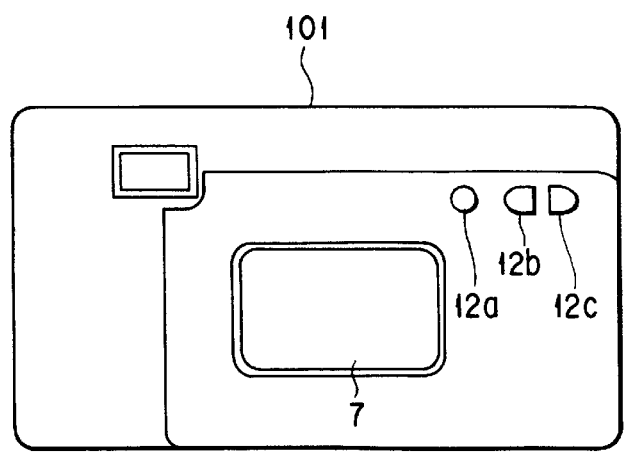
FIG. 4 shows a state of an LCD 7 and each kind of operation switch which are arranged on a rear surface of the digital camera.

An output of the aforementioned CPU 4 is connected to an input of the LCD 7 via a VRAM (Video RAM) 6. At the same time, the output thereof is connected to the input of a power source control part 9 and a communication driver 11. The aforementioned LCD 7 has a back-light drive circuit 7b. Furthermore, as shown in FIG. 4, the LCD 7 is arranged at a predetermined position of a rear surface of the camera 101. The aforementioned communication driver 11 is connected to a communication driver 13 on the side of the digital color printer 102 via the communication cable 23 thereby realizing communication between the digital camera and the digital color printer.

Furthermore, the aforementioned power source control part 9 serves to supply a voltage of the power source 8 to the LCD 7, the CCD driver 10 and the communication driver 11 at a predetermined timing under the control of the CPU 4. As this power source 8, for example, a AA battery and a rechargeable battery can be used, but it goes without saying that the invention is not limited thereto.

Figure 3:
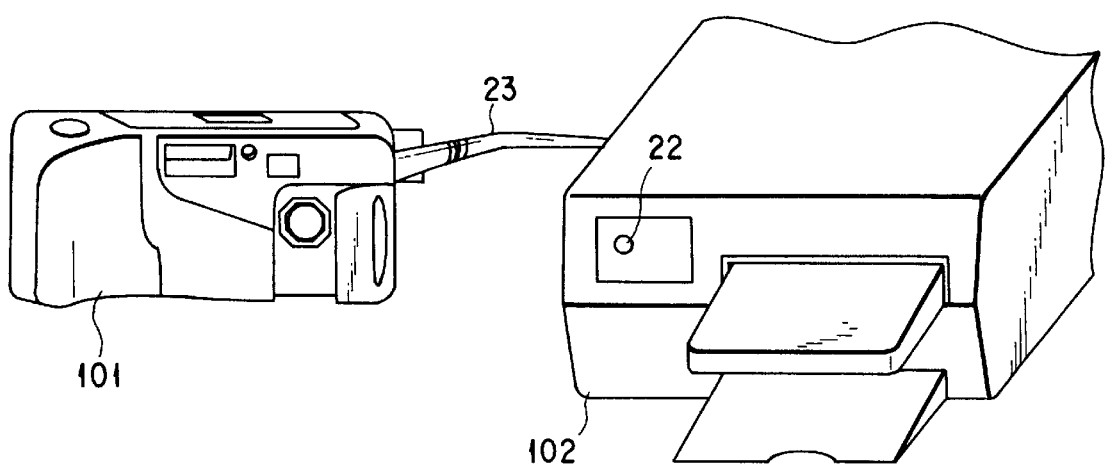
FIG. 3 shows a state in which a print is prepared by connecting the digital camera and the digital color printer with a communication cable.

On the other hand, on the side of the aforementioned digital color printer 102, the communication driver 11 on the side of the aforementioned digital camera 101 and the communication driver 13 on the side the digital printer 102 are mutually connected via the communication cable 23, and the output of the communication driver 13 is connected to the input of the CPU 14. The output of this CPU 14 is connected to the input of a paper feeding part 20. At the same time, the output thereof is connected to a print head 19 via an image memory 15, an image memory 16, a buffer memory 17, and a driver 18. Furthermore, to this CPU 14, for example, a print start SW 22 for allowing an operator to command a start of printing is connected, the start SW 22 being arranged at a position shown, for example, in FIG. 3.

Furthermore, the power source part 21 serves to convert an alternate current power source from the outside to a direct current to supply the current to each block of the digital color printer 102 at a predetermined voltage.

Incidentally, the aforementioned communication drivers 11 and 13 are connected via the communication cable 23 as described above. Besides, it goes without saying that the aforementioned communication drivers 11 and 13 can freely communicate by means of known communication means such as infrared radiation, radio communication or the like. Furthermore, as a printing method of the digital color printer 102 having the aforementioned structure, for example, a dye-sublimation type thermal transfer method can be adopted.

In such a structure, an operation of the digital camera 101 will be explained in the beginning. After the image is picked up by the CCD 1, the analog signal is input to the A/D conversion circuit 2. After this analog signal is converted into a digital signal with the A/D conversion circuit 2, the analog signal is temporarily memorized in the RAM 3 at the rear stage.

Then, the data which is memorized in this RAM 3 is read with the CPU 4 so that each kind of processing such as color conversion of white balance or the like, JPEG image compression is performed by a calculation part inside of the CPU 4. Then, after each kind of processing is performed, the image data is subsequently memorized for each picking up frame in the flash ROM 5.

When the operator operates the reproduction mode switch 12a in this state, the operation information is recognized with the CPU 4, the image data of the flash ROM 5 is read by the control of the CPU 4, and the compressed image data is expanded for displaying the image data on an LCD. Then the data is written on an image memory VRAM 6 for display so that a display image appears on the LCD 7. At this time, the power source is simultaneously supplied to the back-light drive circuit 7b.

Subsequently, when the operator operates the switches 12b and 12c, the image data which is memorized in the flash ROM is appropriately selected and is subsequently displayed as a display image on the LCD 7 in the same manner. There are a digital camera which prepares a color image by using a complementary color filter with a CCD 1 of the aforementioned camera 101, and a camera which prepares a color image by using an original color filter. In any case, the camera can be connected to the digital color printer 102.

On the other hand, when the CPU 14 on the side of the digital color printer 102 receives an image file data from the aforementioned camera 101, the image file data is temporarily stored in the image memory 16. Then, after the CPU 14 subsequently develops data for each of such colors as yellow (Y), magenta (M), and cyan (C) in one screen portion on the image memory 15 while the CPU 14 performs the extension processing of the image file data which is stored in the image memory 16, followed by carrying out the printing process. At this time, for example, it goes without saying that a processing such as gamma conversion processing, edge enhancement processing or the like for each color may be performed.

Furthermore, the CPU 14 feeds paper to be printed by driving the paper feeding part 20 and sets the paper at an initial position of a printing start, and at the same time, the image data to be printed which is stored in the image memory 15 is transmitted to a buffer memory 17 to start printing via a driver 18 by controlling the print head 19. This print head 19 is capable of printing one line portion of printing paper at the same time, and the aforementioned paper feeding part 20 feeds one line portion of the paper each time one line printing is ended.

In this manner, the CPU 14 is driven by synchronizing the paper feeding part 20 with the transmission of printing data to the print head 19. When an operation of printing a desired image is finished, the CPU 14 drives the paper feeding part 20 to exhaust the paper.

By the way, during at least part of a period when data is sent from the aforementioned digital camera 101 to the digital color printer 102, the operation of the back-light drive circuit 7b of the LCD 7 and a signal processing circuit which is operated at the time of picking up images, for example, a CCD driver 10, a drive system of the picking up lens, a stroboscope rechargeable circuit or the like is suspended.

Here, when the aforementioned digital camera 101 and the digital color printer 102 are connected via the communication cable 23, it is recognized that the digital camera 101 is connected to the digital printer 102 by sending a connection confirmation signal to the camera 101 from the digital color printer 102 with the result that a response signal is sent back to the digital color printer 102.

Users start a printing operation by operating the print start SW 22 on the side of the digital color printer 102 in the state in which an image which is desired to be printed is displayed by the digital camera 101 on the LCD 7 as a reproduced image. It goes without saying that this printing operation may be started after a full screen display on the LCD 7 is completed.

Figure 2:
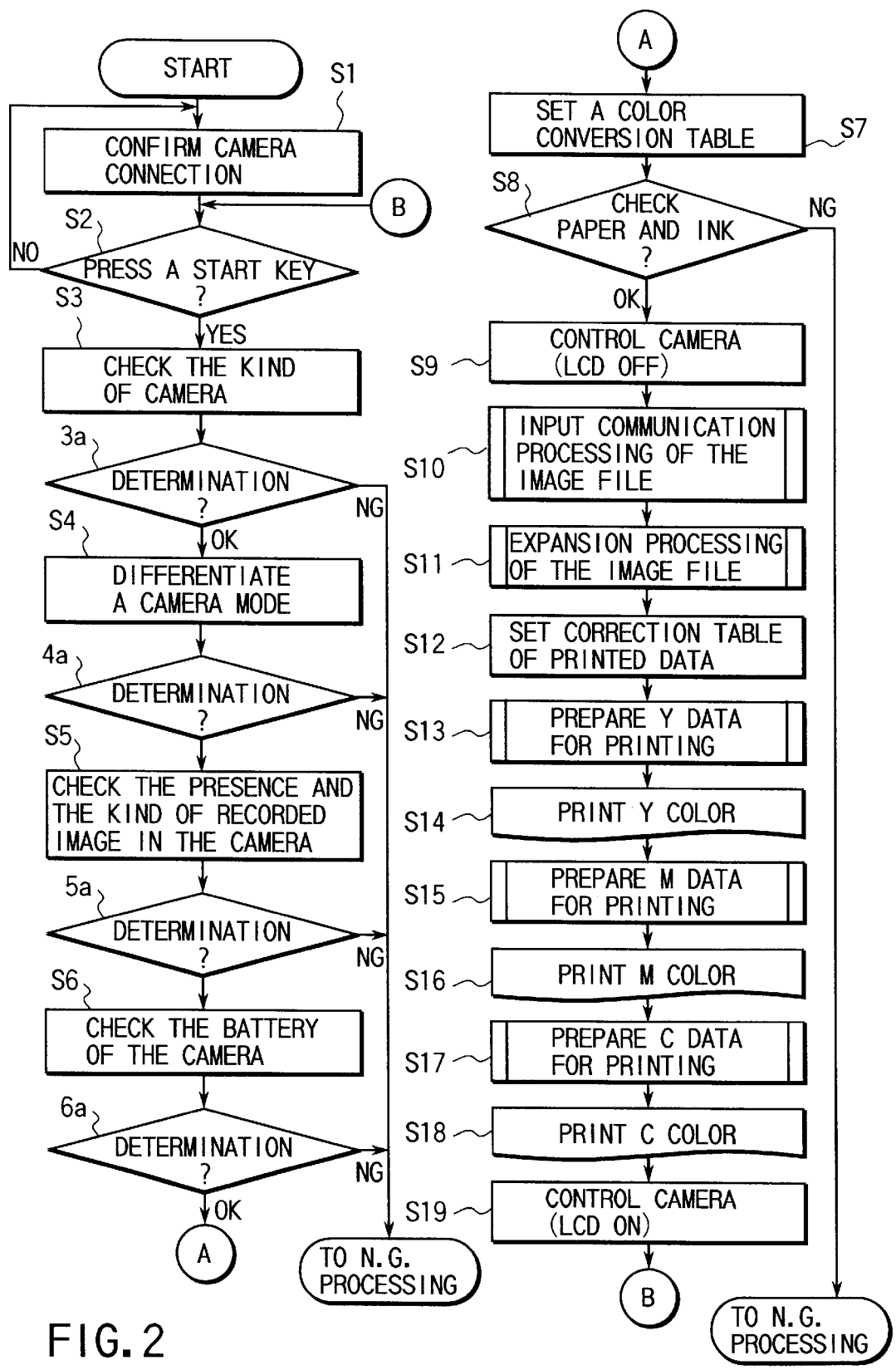
FIG. 2 shows a control flow of a CPU 14 which carries out each kind of control with the digital color printer of the present invention.

A printing operation of the CPU 14 after the print start SW22 is pressed will be explained by referring to the flowchart shown in FIG. 2.

When the printing operation is started, the CPU 14 performs a confirmation operation as to whether the digital camera 101 is connected to the digital color printer 102 via the communication cable 23 (step S1). Subsequently, the CPU 14 detects whether or not the print start SW 22 of the digital color printer 102 is pressed down (step S2). When the switch 22 is not pressed down, the process returns to the aforementioned step S1.

While the print start SW 22 which is arranged on the side of the digital color printer 102 is not pressed down, a communication to the digital camera 101 is performed regularly by repeating the processing of the step S1 thereby preventing an automatic OFF of the power source as a result of the time out of the digital camera 101.

On the other hand, when it is confirmed that the print start key 22 is pressed down at the aforementioned step S2, the CPU 14 detects that the print start key 22 is pressed down, the CPU 14 detects information on the kind of digital camera which is connected via the communication cable 23 (step S3). Here, the kind of digital camera is confirmed which is capable of printing the image directly from the digital camera 101 from the information on the kind of digital camera (step S3a). When it is made clear that the digital camera is not the corresponding kind, the process proceeds to N.G. processing. Furthermore, when the digital camera is the corresponding kind, the information on the kind of the digital camera is stored in the incorporated memory of the CPU 14. Next, the process proceeds to the following step when the image is already recorded by checking whether or not there is a camera record image. When there is no camera record image, the process proceeds to the N.G. processing because there is no image which can be printed (step S4, S4a).

Then, the CPU 14 differentiates the operation mode of the digital camera 101. Only in the case where the digital camera 101 is set in a reproduction mode, the process proceeds to the following step. Since the printing cannot be performed in other modes such as, for example, a picking up mode, the process proceeds to the N.G. processing (step S5, S5a).

Next, the residual amount of the battery of the digital camera 101 is checked. When the residual amount of the battery is not less than the predetermined amount in the state in which the battery is used as the power source, the process proceeds to the following step S7. However, when the residual amount is less than the predetermined amount, the process proceeds to N.G. processing (step S6, S6a).

Subsequently, it is recognized at the aforementioned step S3 that, for example, the CCD 1 which is being used uses a complementary color filter or an original color filter so that a color adjustment of the image data which is sent after a color conversion table corresponding to the information on the kind of printer is set (step S7).

Then, it is checked whether or not the printing paper is set, or an ink ribbon is run out in the process of checking an inside of the digital color printer 102. When, the absence of the paper, the run-out of the ink ribbon or the like is detected, the process proceeds to the N. G. processing to perform the printing operation by fetching the image data from the actual digital camera 101 when there is no problem (step S8).

When the process proceeds to the N.G. processing from each step up to this time, a processing corresponding to respective content check is performed. For example, when there is no paper and no ink ribbon, a disadvantage is notified to users by emitting a display LED not shown or generating a warning sound with a buzzer or the like.

Furthermore, when there is a problem on the side of the digital camera 101, the display of the aforementioned warning is given. At the same time, the power source 8 of the digital camera 101 can be controlled by turning off the power source 8. Furthermore, in the case where the residual amount of the battery of the digital camera 101 is not more than the predetermined amount, there is provided a method of taking means for turning off the power source of the digital camera 101 with the digital color printer 102 despite the printing operation in order to avoid the danger that the power source of the digital camera 101 is turned off during communication.

Subsequently, the process proceeds to the processing after step S8, and a process for receiving the image data with the digital camera 101 will be explained.

In the beginning, the display of the LCD 7 of the digital camera 101 is erased (step S9) to perform an operation of receiving an image file to be printed (step S10). The image file which is sent at this time may be sent in the state in which the image file includes the picking up condition with the digital camera 101, for example, data such as a shutter speed, an exposure time or the like. Furthermore, the image file which is sent is an image file which is compressed in the JPEG method.

Next, the image file which is compressed in the JPEG method is subjected to an image processing for expanding the compressed file contrary to the time of compressing the image thereby expanding and developing the image to the original state (step S11). Next, a correction table of an appropriate image data is called and set from the data of the picking up condition which is included in the aforementioned image file (step S12). The correction table serves to convert the image data for each color for printing to provide data to be printed in combination with a color conversion table which is set at step S7 in advance.

Furthermore, the data of yellow (referred to as "Y" hereinafter) is developed on an image memory 15 in agreement with the color of the ink ribbon for printing (step S13). The color data which is developed is output to a print head for each of one line one after another to print one screen portion of Y (step S14).

Next, another color for printing, for example, magenta (referred to as "M" hereinafter) is printed on one screen in the similar manner at step S15, and step S16. Then, cyan (referred to as "C") is printed on one screen in the similar manner at step S17 and step S18 with the result that a full color printing on one screen is ended. In this manner, when printing on one screen is ended, the display of the LCD 7 of the digital camera 101 is turned on so that the next screen can be selected by users (step S19) to return to step S2 for waiting for the instruction for the next printing.

In this manner, when one screen portion of the data is output, a print end signal is sent from the printer 102 to the side of the digital camera 101 thereby ending the printing operation. During this printing operation, the operation button of the digital camera 101 itself cannot be used in the digital camera 101. When the printing operation is ended, the operation button 12 can be used.

As described above, an embodiment of the present invention has been explained, but the invention is not limited thereto. It goes without saying that various kinds of improvement and change can be made without deviating from the gist of the invention. For example, it has been described that the image file in the embodiment can be normally printed in one screen. For example, when a plurality of image frames are arranged to provide an index image, or a multiple screen is printed wherein a plurality of screens are arranged in vertical and horizontal directions, an index image having a small amount of data for PC is transmitted to the digital color printer. In the digital color printer, a plurality of index images are laid out so that the images can be printed to perform the printing operation. Furthermore, as the aforementioned digital color printer, a color ink jet printer, a color sublimation type printer or the like can be adopted.

As explained above, according to the embodiment of the invention, the following advantage can be obtained.

In other words, firstly, the image file which is stored and compressed in the digital camera is sent to the digital color printer as it is, and the image file is developed (expanded) with the aforementioned digital color printer to be converted into an image data to be printed so that communication can be performed in a very short time as compared with a process of sending the data to the digital color printer after converting the digital data to data to be printed with the digital camera.

Secondly, the image file to be printed is sent to the digital color printer and is temporarily stored so that color correction can be easily made in agreement with the characteristic of each kind of the digital camera with data on the kind of printer which is sent at the same time with the image file. Furthermore, color correction or tone correction which agrees with the condition at the time of picking up an image with the camera which condition is sent at the same time with the image file so that a high printing quality can be easily obtained.

Thirdly, when the residual amount of the battery is not more than the predetermined amount by checking the battery of the digital camera, a printing error caused by an interruption of printing after the start of the printing operation can be easily avoided.

Fourthly, there is provided an advantage of suppressing the consumption of the power of the digital camera by turning off of the LCD for the display of the digital camera during printing.

Fifthly, there is provided an advantage in that a state in which the image can be printed at any time can be maintained in the state in which the digital camera and the digital color printer are connected by preventing an automatic drop of the power source of the digital camera in the state in which the digital camera is not operated so that the usage convenience of the digital camera is preferable.

As described above, according to the present invention, there is provided a digital camera, a digital color printer and a digital color printer system using the same; wherein the communication time is shortened, the reproduction is improved, and usage convenience is improved when the digital image of an image which is picked up by the digital camera is sent to the digital color printer.

In other words, the transmission time is shortened by transmitting the compressed image data with the result that the printing time can be shortened. Furthermore, it is not required that the digital camera prepares the image data to be printed for the digital color printer, the number of constituent parts such as a memory or the like can be reduced and the cost can be reduced.

Furthermore, the condition at the time of picking up an image with the picking up device and the characteristic data peculiar to the picking up device are sent to the outside machine along with the compressed image data thereby facilitating the reproduction processing and printing of an optimal image. Furthermore, it is not necessary to store the characteristic data of each picking up device with the outside machine by sending the characteristic data of the picking up device to the image data that the elimination of the constituent parts such as a memory or the like leads to the cost reduction.

Furthermore, in addition to the aforementioned advantage, while the data to be printed is being printed with the digital color printer, the consumption of the power source of the digital camera can be suppressed by the turn-off of the liquid crystal monitor of the digital camera with the result that the life of the battery or the like can be prolonged.

Furthermore, when the index image is printed, the index image can be converted to a predetermined print size in the image processing corresponding to a thumb nail file (namely, the thumb nail file is an image for allowing users to intuitively recognize the file content) with the result that the image processing time by means of the digital camera can be made in a very short time as compared with the normal image file, and a communication time between the digital camera and the digital color printer can be largely shortened.

Then, there is an advantage in that when communication is performed with the digital camera for printing the image, a disadvantage can be prevented such that the printing operation is suspended in the midst because of the run-out of the digital camera by preventing the printing operation when the residual amount of the battery is not more than the predetermined amount.

Furthermore, there is an advantage in that since the power consumption of the digital camera is automatically saved with the time out of the digital camera when the digital camera is not operated for a predetermined time in the state in which communication is performed between the digital camera and the digital color printer, an operation necessary for printing is prevented from being suspended as a result of the saving of the power consumption of the digital camera by sending a predetermined communication command having no effect on substantial operation thereof.

Furthermore, there is an advantage in that since the power consumption of the digital camera is automatically saved as a result of time out of the camera when the digital camera is not operated for the predetermined time in the state in which communication is performed between the digital camera and the digital color printer, an operation necessary for printing can be prevented from being suspended as a result of the saving of the power consumption of the digital camera by sending a predetermined communication command which is not operated.

Then, the power consumption of the digital camera can be saved by cutting off the power supply for predetermined parts thereof extending parts necessary for printing the image.

Furthermore, there is an advantage in that a preferable print image can be obtained by performing an optimal correction processing which corresponds to various picking up conditions.

In addition, there is an advantage in that a difference in printing condition is eliminated between different kinds of digital cameras by storing in advance the characteristic of the color conversion of the CCD though the color conversion characteristic of the CCD to be used is different from one kind of printer to another.

Additional advantages and modifications will readily occur to those skilled in the art. Therefore, the invention in its broader aspects is not limited to the specific details and representative embodiments shown and described herein. Accordingly, various modifications may be made without departing from the spirit or scope of the general inventive concept as defined by the appended claims and their equivalents.

What is claimed is:

1. A digital color printer apparatus capable of printing images corresponding to image data received from a digital camera operatively connected therewith, said digital color printer apparatus comprising:

a communication circuit for receiving and sending data from/to said digital camera through the communication circuit;

a control unit for controlling operation of the digital color printer apparatus, including operation of said communication circuit; and a print start switch disposed on a predetermined portion of the digital color printer apparatus;

wherein said control unit performs a confirmation operation to confirm that the digital camera is connected to the digital color printer apparatus via said communication circuit when the print start switch is operated, and repeats the confirmation operation when the print start switch is no longer operated so as to prevent an automatic power OFF of a power source as a result of a time out of said digital camera.

2. A digital color printer apparatus capable of printing images corresponding to image data received from a digital camera operatively connected therewith, said digital color printer apparatus comprising:

a communication circuit for receiving and sending data from/to said digital camera through the communication circuit; and a control unit for controlling operation of the digital color printer apparatus, including operation of said communication circuit;

wherein said control unit detects a state of a battery of said digital camera via said communication circuit to determine whether a residual power amount of the battery is sufficient to complete a printing operation, and permits the printing operation to proceed only when the residual power amount is sufficient.

3. A digital color printer apparatus in accordance with claim 2, wherein said control unit controls said digital camera to be turned off when the residual power amount of the battery is not sufficient.

4. A digital color printer apparatus capable of printing images corresponding to image data received from a digital camera operatively connected therewith, said digital color printer apparatus comprising:

a communication circuit for receiving and sending data from/to said digital camera through the communication circuit; and a control unit for controlling operation of the digital color printer apparatus, including operation of said communication circuit;

wherein said control unit controls said digital camera so that an operation button of the digital camera cannot be used during a printing operation, and said control unit sends a print end signal to said digital camera to enable use of the operation button of the digital camera when the printing operation is ended.

* * * * *